United States Patent [19]

Robinson

[11] 4,127,295
[45] Nov. 28, 1978

[54] TRUCK BUMPER AND CABLE WINCH UNIT

[76] Inventor: Raymond W. Robinson, P.O. Box 104, Bieber, Calif. 96009

[21] Appl. No.: 823,664

[22] Filed: Aug. 11, 1977

[51] Int. Cl.² .............................................. B61F 19/04
[52] U.S. Cl. .............................. 293/69 R; 242/86.5 R; 254/166
[58] Field of Search ................. 254/166; 273/69 R, 1; 242/86.5 R, 86.52

[56] References Cited

U.S. PATENT DOCUMENTS

| | | | |
|---|---|---|---|
| 1,727,678 | 9/1929 | Stedelin et al. | 254/166 |
| 2,729,500 | 1/1956 | Dickenshied et al. | 293/69 R |
| 2,731,233 | 1/1956 | Lindsay | 254/166 X |
| 3,774,949 | 11/1973 | Eger | 293/69 R |
| 3,946,991 | 3/1976 | Eriksson | 254/166 |

Primary Examiner—Trygve M. Blix
Assistant Examiner—Sherman D. Basinger
Attorney, Agent, or Firm—Roger B. Webster

[57] ABSTRACT

A truck bumper and cable winch unit which embodies a bumper extending transversely in spaced relation ahead of the frame of a truck, structure rigidly securing the bumper in connection with the truck frame, a housing fixed rearwardly of the bumper intermediate its ends, the securing structure and the bumper defining the housing in part, the bumper having a forwardly facing opening therein in communication with the housing, a door normally closing the opening, the door being adapted to carry an overlying license plate whereby the door is normally concealed by the license plate, a power-driven cable winch mounted in the housing, the winch including a drum having a cable wound thereon, the cable being adapted to pay from the drum and thence extend as a reach through the opening and beyond the door when the latter is open, vertical-axis cable reach guide spools secured on the bumper at each end of the opening, and vertical axis sheaves mounted in connection with the ends of the bumper and each exposed in part for reception in direction-changing relation of the cable reach.

2 Claims, 5 Drawing Figures

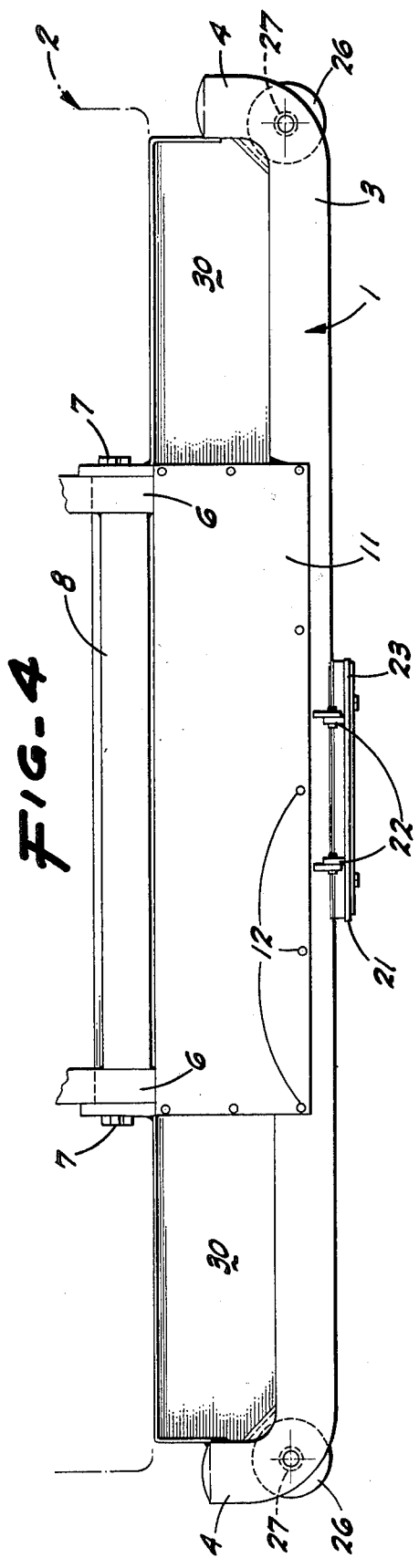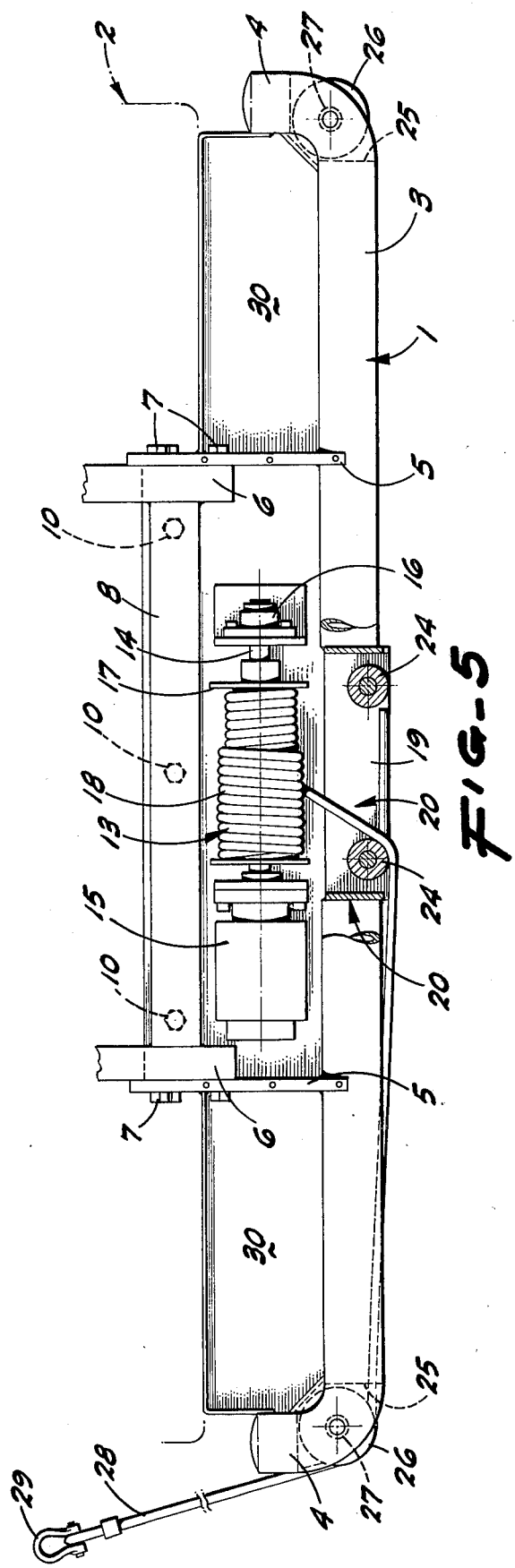

TRUCK BUMPER AND CABLE WINCH UNIT

BACKGROUND OF THE INVENTION

1. Field of the Invention

While front-end-mounted, power-driven cable winches for trucks are known, such winches have, conventionally, been mounted in a wholly exposed position, and hence are exposed to the elements, as well as subject to vandalism and theft. Additionally, conventional front-end-mounted winches permit only of forward extension of the cable reach for use. The present invention was conceived in a successful effort to provide a front-end-mounted, power-driven cable winch which—in combination with front bumper of the truck—is enclosed and normally out of sight; the arrangement also providing not only for forward extension of the cable reach, but also reeving thereof for rearward extension when the winch is in use.

2. THE PRIOR ART

U.S. Pat. Nos. 2,411,626; 2,545,795; 3,265,428; 3,515,297 and 3,788,605 German Pat. No. 1,014,724 represent the most relevant prior art known to applicant.

The above prior art—considered singly or together—does not anticipate, nor suggest as obvious, the particular structure of the herein-claimed truck bumper and cable winch unit, and applicant has no knowledge of any prior art disclosing such particular structure.

SUMMARY OF THE INVENTION

The present invention provides, as a major object, a truck bumper and cable winch unit which embodies a bumper extending transversely in spaced relation ahead of the frame of a truck, means rigidly securing the bumper in connection with the truck frame, a housing fixed rearwardly of the bumper intermediate its ends, said securing means and the bumper defining the housing in part, the bumper having a forwardly facing opening therein in communication with the housing, a door normally closing said opening, the door being adapted to carry an overlying license plate whereby said door is normally concealed by such license plate, a power-driven cable winch mounted in the housing, said winch including a drum having a cable wound thereon, the cable being adapted to pay from the drum and thence extend as a reach through said opening and beyond the door when the latter is open, vertical-axis cable reach guide spools secured on the bumper at each end of the opening, and vertical axis sheaves mounted in connection with the ends of the bumper and each exposed in part for reception in direction-changing relation of said cable reach.

The present invention provides, as a further object, a truck bumper and cable winch unit which is designed for ease and economy of manufacture, and convenience of installation.

The present invention provides, as a still further object, a practical, reliable, and durable truck bumper and cable winch unit, and one which is exceedingly effective for the purpose for which it is designed.

BRIEF DESCRIPTION OF THE DRAWINGS

FIG. 4 is an enlarged plan view, of the bumper and cable winch unit, taken substantially on line 4—4 of FIG. 1.

FIG. 5 is a similar view but partially broken away and with the cover plate removed to show the winch; the view illustrating the cable reach as drawn from the winch drum and reeved to extend rearwardly along one side of the truck.

DESCRIPTION OF THE PREFERRED EMBODIMENT

Figure 1:
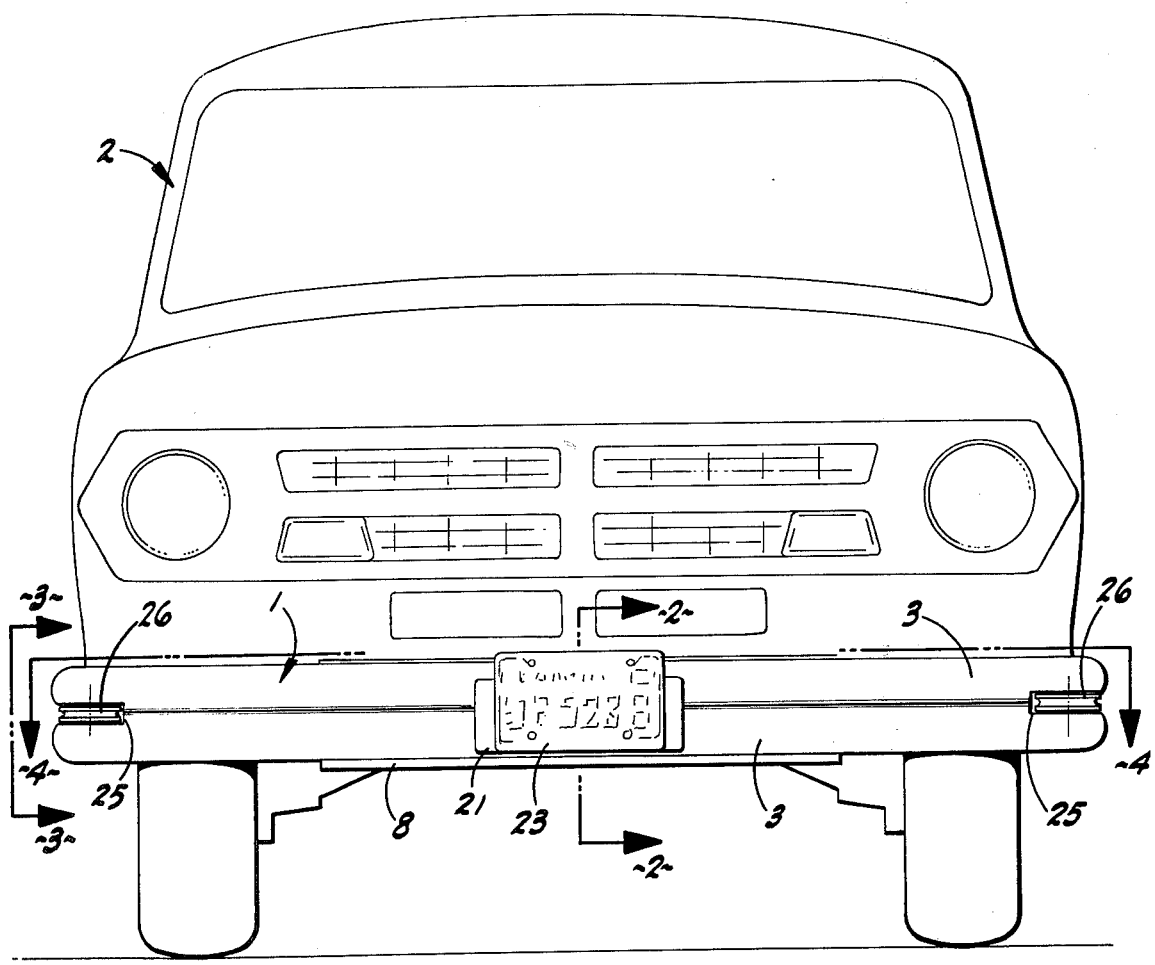
FIG. 1 is a front elevation of the bumper and cable winch unit as mounted on the front end of a truck.
Figures 2, 3:
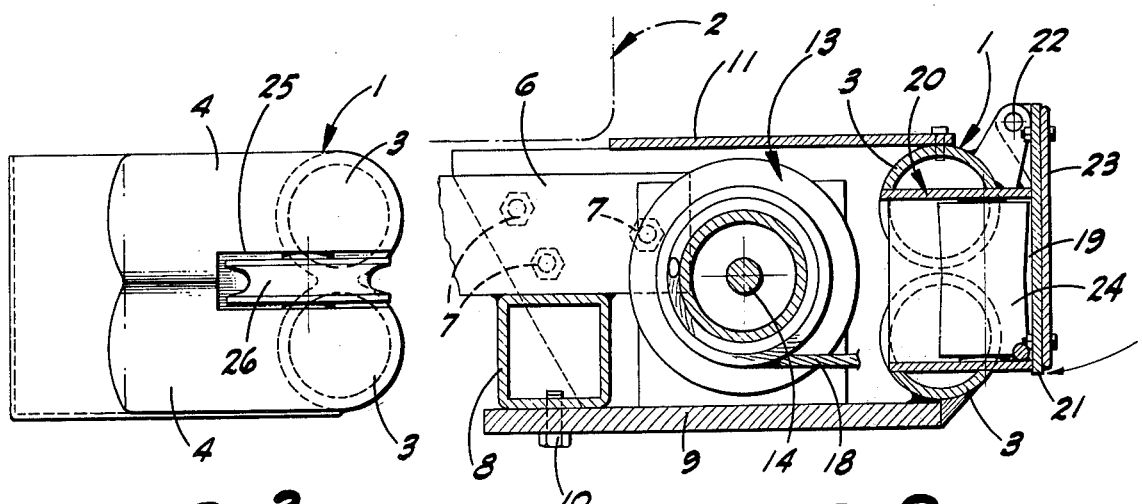
FIG. 2 is an enlarged cross sectional elevation taken substantially on line 2—2 of FIG. 1.
FIG. 3 is an enlarged end elevation taken substantially on line 3—3 of FIG. 1.

Referring now more particularly to the drawings and to the characters of reference marked thereon, the truck bumper and cable winch unit comprises a heavy-duty bumper, indicated generally at 1, disposed transversely and in spaced relation ahead of the front end of a truck, indicated generally at 2. The bumper 1 is formed of two heavy-gauge tubes 3 arranged in superposed relation and welded together at the line of engagement; such bumper being rear-turned at its ends as at 4.

The bumper 1 is mounted on the truck as follows:

Flat, vertically disposed extension plates 5 are rigidly secured to the transversely-spaced front ends 6 of the truck frame by bolts 7; such extension plates 5 projecting forwardly to, and being welded in connection with, the bumper 1. Additionally, such front ends 6 of the truck frame are connected, from beneath, by a welded-in-place cross beam 8. A bottom plate 9, which spans in secured relation between the lower edges of the extension plates 5, is bolted at the rear, as at 10, to the underside of cross beam 8 and thence extends forwardly to welded connection with the bottom of the bumper 1.

A cover plate 11 spans between the upper edges of the extension plates 5; such cover plate—at the front—laps the bumper 1, and thence extends rearwardly to substantially the vertical transverse plane of the front of the cross beam 8. Such cover plate 11 is removably attached to the bumper 1 and to the extension plates 5 by screws 12.

The extension plates 5, bottom plate 9, cover plate 11, and the portion of the bumper between said extension plates define a rigid housing which encloses an electric-motor-driven winch 13 which rests on and is fixedly secured to said bottom plate 9. The winch 13 includes a central shaft 14 driven at one end by an electric motor 15, and supported at the opposite end by an outboard bearing 16. Between the electric motor 15 and outboard bearing 16, the shaft 14 is fitted with a cable drum 17 on which a cable drum 18 is wound; the inner end of such cable being anchored to the drum 17.

As so mounted, the winch 13 occupies a position substantially centrally between the ends of bumper 1; said bumper—immediately in front of the cable drum 17—having a rectangular but transversely elongated, horizontal opening therethrough, as at 19. The opening 19 is boxed top, bottom, and sides, as at 20. A door 21 normally covers the opening 19 is hinged at the top, as at 22, for upward swinging from its normally closed position to an upswung or open position. The door 21 is adapted for reception, in overlying relation, of a license plate 23 which substantially encompasses the entire door 21 and hence effectively conceals its existence as well as that of the opening 19 in the bumper.

Within the confines of said opening 19, and at each end thereof, there is journaled—in connection with the bumper—a vertical-axis cable guide roller 24.

Each of the rear-turned ends 4 of bumper 1 is formed with a notch 25 in which a vertical-axis, direction-changing sheave 26 is journaled, as at 27; the position of each notch being such that the related sheave 26 projects outwardly at one point in its periphery at the turn of the related end 4 of the bumper.

When the winch 13 is not in use, and at which time the door 21 is closed and concealed by the license plate 23, the winch 13 is wholly out of sight and hence protected from the elements, and against vandalism and theft.

For use of the winch 13, the door 21 is manually swung upward to its open position, and the cable 18 is then drawn, as a reach, through the opening 19. If the cable is to be used in forward extension (as—for example—for anchored connection to a fixed object at a point ahead, and to pull the truck forward from a stuck position), the cable reach is merely drawn from the drum 17 in such direction and anchored. The winch 13 is then actuated by the electric motor 15 to wind the cable onto the drum. The motor 15 is, of course, included in a suitable manually controlled, truck-battery-energized circuit (not shown but which is essentially conventional).

If it be desired to anchor the cable at a point rearwardly of the front end of the truck, and laterally thereof, the cable 18—as drawn as a reach 28 from the drum 17—is first trained about one of the vertical-axis cable guide rollers 24, thence extends laterally to and about the corresponding direction-changing sheave 26, and finally extends rearwardly alongside the truck a selected distance and to a point of fixed anchorage. With this arrangement, the cable 18 (including its rearwardly extending reach 28) acts to impose a rearward pull on the truck when the winch 13 is operated in a cable-winding-on direction. This feature of the present invention has many advantages, and, as an example, may be employed to move a truck backward from a stuck position.

As usual, the cable 18 is fitted—at its outer end—with a suitable connector (here shown as a shackle 29).

If desired, open-top, load-supporting boxes 30 may be fixed in connection with the bumper and extend from the extension plates 5 to the rear-turned ends 4 of said bumper; such boxes being configured to receive, for example, "Jeep"-type water or fuel cans, or such other cargo as the configuration of the boxes 30 may accommodate.

It will be apparent that if the electric-motor-driven winch 13, or the cable 18 wound thereon, requires any service or other attention, access is provided by merely removing the retention screws 12 and lifting away of the cover plate 11.

From the foregoing description, it will be readily seen that there has been produced such a truck bumper and cable winch unit as substantially fulfills the objects of the invention, as set forth herein.

While this specification sets forth in detail the present and preferred construction of the truck bumper and cable winch unit, still in practice such deviations from such detail may be resorted to as do not form a departure from the spirit of the invention as defined by the appended claims.

I claim:

1. A bumper and cable winch unit comprising a horizontal bumper adapted to extend transversely in spaced relation ahead of the frame of a truck, means to rigidly secure the bumper to the front end of the truck frame, a support fixed in the zone between the bumper and the front end of the truck frame, a power-driven cable winch disposed in such zone and mounted on the support, the winch including a drum having a cable wound thereon, the bumper having an opening therethrough directly ahead of the drum, the cable upon unwinding from the drum passing through the opening and extending therefrom as a working reach, transversely spaced cable guide means mounted in such opening and adapted for engagement, in direction-changing relation, by the cable passing through said opening, the cable guide means being positioned to permit the working reach of the cable to run laterally, in one direction or the other, from such guide means to a corresponding end of the bumper, and vertical-axis sheaves journaled on the ends of the bumper and each sheave being positioned to receive said laterally-running working reach of the cable and turn such reach to run rearwardly, from said corresponding end of the bumper, alongside the truck.

2. A bumper and cable winch unit, as in claim 1, in which the vertical-axis sheaves are recessed in the ends of the bumper, with peripheral exposure at a point and to an extent for reception of said laterally-running working reach of the cable.

* * * * *